United States Patent
Otsuka et al.

(10) Patent No.: US 11,333,765 B2
(45) Date of Patent: May 17, 2022

(54) DISTANCE MEASURING DEVICE AND METHOD

(71) Applicant: SAMSUNG ELECTRONICS CO., LTD., Suwon-si (KR)

(72) Inventors: Tatsuhiro Otsuka, Suwon-si (KR); Jungwoo Kim, Hwaseong-si (KR); Heesun Yoon, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 509 days.

(21) Appl. No.: 16/385,243

(22) Filed: Apr. 16, 2019

(65) Prior Publication Data

US 2019/0353788 A1 Nov. 21, 2019

(30) Foreign Application Priority Data

May 17, 2018 (KR) .................. 10-2018-0056688
Dec. 20, 2018 (KR) .................. 10-2018-0166407

(51) Int. Cl.
*G01S 17/00* (2020.01)
*G01S 17/89* (2020.01)
*G01S 17/87* (2020.01)
*G01S 17/14* (2020.01)

(52) U.S. Cl.
CPC .............. *G01S 17/89* (2013.01); *G01S 17/14* (2020.01); *G01S 17/87* (2013.01)

(58) Field of Classification Search
USPC ....................................................... 356/5.01
See application file for complete search history.

(56) References Cited

U.S. PATENT DOCUMENTS

| | | | |
|---|---|---|---|
| 5,357,331 A | 10/1994 | Flockencier | |
| 5,565,870 A | 10/1996 | Fukuhara et al. | |
| 5,682,225 A | 10/1997 | DuBois et al. | |
| 7,206,062 B2 * | 4/2007 | Asbrock | G01S 7/483 356/4.01 |
| 7,652,752 B2 * | 1/2010 | Fetzer | G01S 17/89 356/4.01 |
| 7,830,442 B2 * | 11/2010 | Griffis | G01S 7/4861 348/340 |
| 8,804,101 B2 * | 8/2014 | Spagnolia | G01S 17/89 356/4.01 |
| 9,036,135 B2 | 5/2015 | Giacotto | |
| 9,077,456 B2 * | 7/2015 | Gotou | H04B 10/116 |
| 9,915,726 B2 * | 3/2018 | Bailey | G01S 17/66 |
| 10,670,397 B2 * | 6/2020 | Otsuka | G01C 15/002 |

(Continued)

FOREIGN PATENT DOCUMENTS

JP 2016-14535 A 1/2016
JP 6270529 B2 1/2018

OTHER PUBLICATIONS

Communication dated Oct. 8, 2019 issued by the European Intellectual Property Office in counterpart European Application No. 19172381.6.

*Primary Examiner* — James R Hulka
(74) *Attorney, Agent, or Firm* — Sughrue Mion, PLLC

(57) ABSTRACT

Provided is a distance measuring method and device for selecting an optimum peak detection signal from among a plurality of peak detection signals, based on a level of at least one of a plurality of amplified electrical signals, and measuring a distance to an object by using the selected optimum peak detection signal.

20 Claims, 10 Drawing Sheets

(56) References Cited

U.S. PATENT DOCUMENTS

| | | | |
|---|---|---|---|
| 2004/0119838 A1* | 6/2004 | Griffis | G01S 7/486 348/215.1 |
| 2006/0232760 A1* | 10/2006 | Asbrock | G01S 17/42 356/4.03 |
| 2007/0024840 A1* | 2/2007 | Fetzer | G01S 7/4811 356/4.01 |
| 2010/0309288 A1* | 12/2010 | Stettner | G01S 17/86 348/43 |
| 2012/0154785 A1* | 6/2012 | Gilliland | G01S 7/4972 356/5.01 |
| 2013/0242283 A1 | 9/2013 | Bailey et al. | |
| 2014/0093254 A1* | 4/2014 | Gotou | H04B 10/63 398/203 |
| 2015/0276921 A1* | 10/2015 | Dunne | G01S 17/10 356/4.01 |
| 2016/0033627 A1* | 2/2016 | Dunne | G01S 7/486 356/4.01 |
| 2016/0313445 A1* | 10/2016 | Bailey | G01S 7/4816 |
| 2017/0222720 A1* | 8/2017 | Farr | H04B 10/54 |
| 2018/0275248 A1* | 9/2018 | Bailey | G01S 17/88 |
| 2019/0011256 A1* | 1/2019 | Otsuka | G01C 15/002 |
| 2019/0170859 A1* | 6/2019 | Bailey | G01S 17/36 |

* cited by examiner

DISTANCE MEASURING DEVICE AND METHOD

CROSS-REFERENCE TO RELATED APPLICATION

This application claims priority from Korean Patent Application No. 10-2018-0056688, filed on May 17, 2018, and Korean Patent Application No. 10-2018-0166407 filed on Dec. 20, 2018 in the Korean Intellectual Property Office, the disclosures of which are incorporated herein by reference in their entireties.

BACKGROUND

1. Field

Apparatuses and methods consistent with exemplary embodiments relate to measuring a distance between objects.

2. Description of the Related Art

One of the techniques for measuring distance information of an object by using a three-dimensional (3D) camera or light detection and ranging (LIDAR) involves measurement of the time required for light to travel back and forth (i.e., time of flight, hereinafter referred to as TOF). The TOF method may include projecting light of a certain wavelength onto a subject, measuring or capturing an image of light of the same wavelength reflected from the subject via a photodiode or a camera, and extracting a depth image therefrom.

SUMMARY

One or more exemplary embodiments provide a distance measuring device and a method of measuring a distance by using the same.

According to an aspect of an embodiment, a distance measuring device includes a light receiver configured to output an electrical signal by detecting light reflected by an object; a plurality of amplifiers configured to generate a plurality of amplified electrical signals by amplifying the electrical signal with different gains, respectively; a plurality of peak detectors configured to generate a plurality of peak detection signals by detecting a peak with respect to each of the plurality of amplified electrical signals; a selector configured to select an optimum peak detection signal from among the plurality of peak detection signals, based on a level of at least one amplified electrical signal from among the plurality of amplified electrical signals; and a processor configured to measure a distance to the object by using the optimum peak detection signal.

The plurality of amplifiers, the plurality of peak detectors, and the selector process the signals in an analog domain.

The processor comprises a time-to-digital converter (TDC) or an analog-to-digital converter (ADC) both receiving the optimum peak detection signal, and the TDC or the ADC process the signals in an analog domain.

The processor comprises one analog-to-digital converter (ADC) or one time-to-digital converter (TDC).

The selector is further configured to select the optimum peak detection signal from among the plurality of peak detection signals by comparing the level of the at least one amplified electrical signal with at least one critical level.

The distance measuring device may further include a temperature sensor configured to sense ambient temperature of the light receiver, wherein the processor may be further configured to control the at least one critical level according to a result of the sensing.

The selector may include at least one comparator configured to output at least one comparison result signal by comparing the level of the at least one amplified electrical signal with at least one critical level; a selection controller configured to output at least one selection control signal corresponding to the at least one comparison result signal; and a multiplexer configured to select the optimum peak detection signal from among the plurality of peak detection signals according to the at least one selection control signal.

The selection controller may include at least one delay flip-flop (D flip-flop).

The light receiver may include a light detector configured to output a current by detecting the light; and a current-voltage converter configured to output, by converting the current to a voltage, the voltage as the electrical signal.

The light detector may include at least one of an avalanche photo diode (APD) and a single photon avalanche diode (SPAD).

Each of the plurality of peak detectors may be configured to detect the peak by using a constant fraction discriminator (CFD) method.

The distance measuring device may further include a light source configured to radiate light in a form of a laser pulse to the object.

According to an aspect of another embodiment, a distance measuring device includes a light receiver configured to output an electrical signal by detecting light reflected by an object; a plurality of amplifiers configured to generate a plurality of amplified electrical signals by amplifying the electrical signal with different gains, respectively; a plurality of delay circuits configured to generate a plurality of delayed electrical signals by delaying each of the plurality of amplified electrical signals during a certain time period; a selector configured to select an optimum delayed electrical signal from among the plurality of delayed electrical signals, based on a level of at least one amplified electrical signal from among the plurality of amplified electrical signals; a peak detector configured to detect a peak of the optimum delayed electrical signal; and a processor configured to measure a distance to the object by using the peak of the optimum delayed electrical signal.

According to an aspect of another embodiment, a distance measuring method includes outputting an electrical signal by detecting light reflected by an object; generating a plurality of amplified electrical signals by amplifying the electrical signal with different gains, respectively; generating a plurality of peak detection signals by detecting a peak with respect to each of the plurality of amplified electrical signals; selecting an optimum peak detection signal from among the plurality of peak detection signals, based on a level of at least one amplified electrical signal from among the plurality of amplified electrical signals; and measuring a distance to the object by using the optimum peak detection signal.

According to an aspect of another embodiment, a non-transitory computer-readable recording medium has recorded thereon a program which performs, when executed by a computer, the distance measuring method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Example embodiments will now be described more fully with reference to the accompanying drawings. The embodiments below are only to specify the technical contents and are not to restrict or limit the right scope of the disclosure. It is interpreted that matters which could be readily inferred by one of ordinary skill in the art from the detailed description and the embodiments belong to the scope of the disclosure. As used herein, the term "and/or" includes any and all combinations of one or more of the associated listed items.

The term "composed of" or "include" used herein should not be construed as necessary including all of several components or several operations written in the specification, but as not including some of the components or operations or as further including additional components or operations. The term ". . . unit" or "module" used herein refers to a unit of processing at least one function or operation, and may be implemented as hardware, software, or a combination of hardware and software.

While such terms as "first" "second" etc., may be used to describe various components, these terms are used only to distinguish one component from another.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Figure 1:
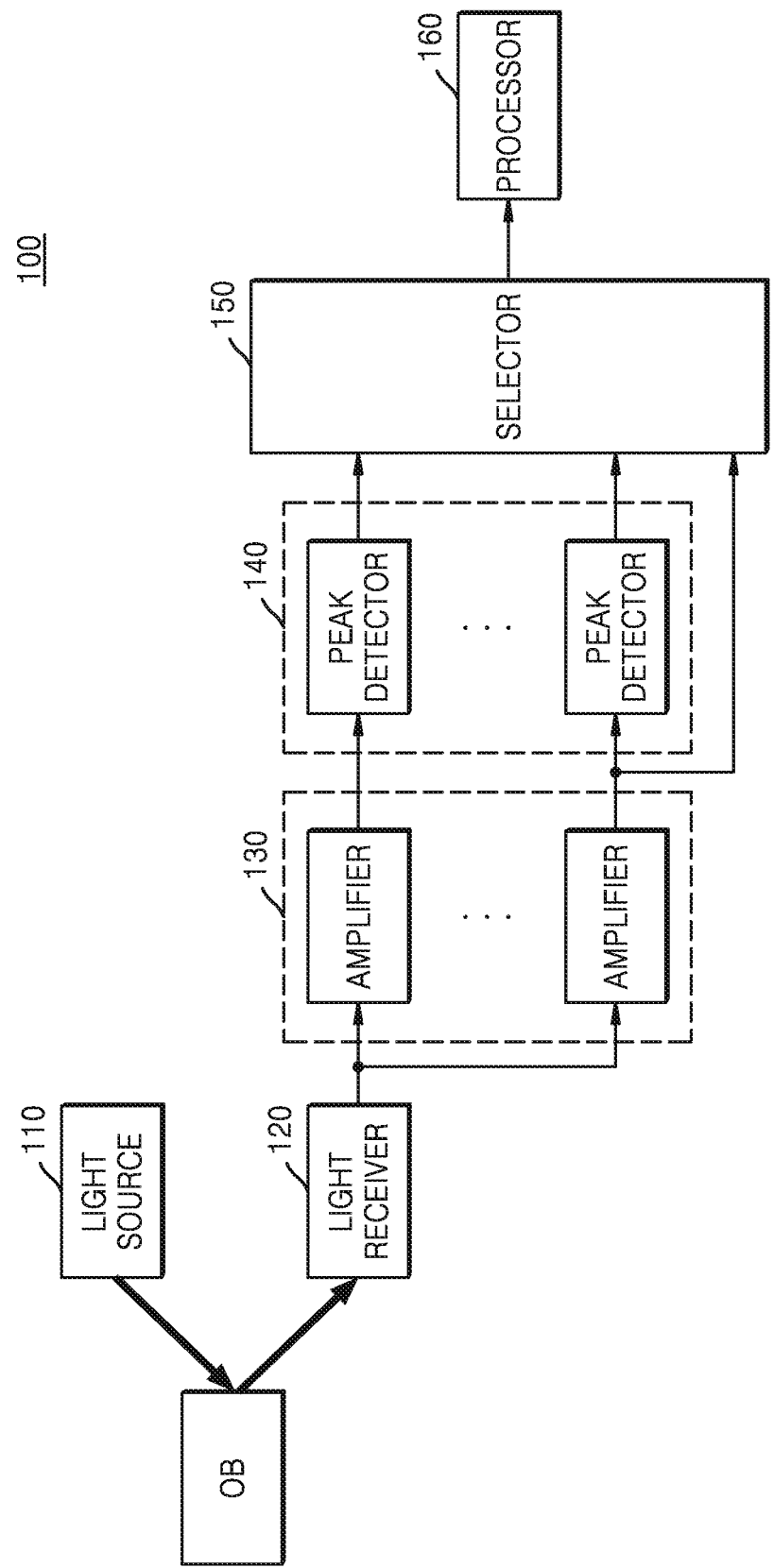
FIG. 1 is a diagram illustrating a distance measuring device according to an embodiment.

FIG. 1 is a diagram illustrating a distance measuring device 100 according to an example embodiment.

The distance measuring device 100 may be utilized as a sensor that obtains three-dimensional (3D) information, such as distance information about a distance to an object in front of the distance measuring device 100, in real time. For example, the distance measuring device 100 is applicable to an unmanned vehicle, an autonomous driving car, a robot, and a drone. For example, the distance measuring device 100 may be a light detection and ranging (LiDAR) device.

The distance measuring device 100 may include a light source 110, a light receiver 120, a plurality of amplifiers 130, a plurality of peak detectors 140, a selector 150, and a processor 160. It will be understood by one of ordinary skill in the art that in addition to the components illustrated in FIG. 1, other components may be further included in the distance measuring device 100.

The light source 110 may radiate light toward an object OB. The light source 110 may generate and radiate pulse light or continuous light. The light source 110 may generate and radiate light beams in a plurality of different wavelength bands. For example, the light source 110 may emit light having an infrared wavelength. When light having an infrared wavelength is used, the light may be distinguishable from visible natural light, such as sunlight. However, light emitted from the light source 110 is not limited to the light having an infrared wavelength, and light having any of various wavelengths may be emitted. In this case, correction may be used to remove information of mixed natural light. For example, the light source 110 may be a laser light source, but is not limited thereto. The light source 110 may be one of an edge emitting laser, a vertical-cavity surface emitting laser (VCSEL), and a distributed feedback laser. For example, the light source 110 may be a laser diode. As necessary, the light source 110 may be included in another device, and does not need to be hardware included in the distance measuring device 100.

The light receiver 120 may detect light reflected or scattered by the object OB to thereby output an electrical signal. For example, the light receiver 120 may convert the light reflected or scattered by the object OB into a voltage signal.

The plurality of amplifiers 130 may generate a plurality of amplified electrical signals by amplifying the electrical signal with different gains, respectively. Respective gains of the plurality of amplifiers 130 may be set to have different gain values from each other, and the plurality of amplifiers 130 may respectively generate a plurality of amplified electrical signals by amplifying the electrical signal output by the light receiver 120 according to the different gain values. For example, the plurality of amplifiers 130 may respectively have different gain values ranging from a predetermined relatively low gain value to a predetermined relatively high gain value.

The plurality of peak detectors 140 may generate a plurality of peak detection signals by detecting a peak of each of the plurality of amplified electrical signals. In other words, the plurality of peak detectors 140 may respectively generate a plurality of peak detection signals by detecting a peak of each of the plurality of amplified electrical signals output by the plurality of amplifiers 130.

Each of the plurality of peak detectors 140 may detect a peak by detecting a central position of the amplified electrical signal. Alternatively, each of the plurality of peak detectors 140 may detect a peak by detecting a width of the amplified electrical signal. Alternatively, each of the plurality of peak detectors 140 may detect a peak by using a constant fraction discriminator (CFD) method in which a zero cross point is detected by dividing the amplified electrical signal into a plurality of signals, inverting and time-delaying some of the plurality of signals, and then combining the signals with the other signals. A circuit that detects a peak by using the CFD method may be referred to as a CFD circuit. Each of the plurality of peak detectors 140 may further include a comparator, and thus, may output the detected peak as a pulse signal.

The selector 150 may select an optimum peak detection signal from among the plurality of peak detection signals, based on a level of at least one amplified electrical signal from among the plurality of amplified electrical signals. In detail, the selector 150 may select an optimum peak detection signal from among the plurality of peak detection signals by determining whether a level of at least one amplified electrical signal from among the plurality of amplified electrical signals is greater than a preset critical level. For example, the selector 150 may determine, via a comparator, whether a level of an amplified electrical signal is greater than a preset critical level.

For example, the plurality of amplifiers 130 may include a first amplifier that amplifies an electrical signal by using a low gain (e.g., a first gain) and a second amplifier that amplifies an electrical signal by using a high gain (e.g., a second gain higher than the first gain). In this case, the selector 150 may determine whether a level of the electrical signal amplified by the second amplifier is greater than a preset critical level, and when the level of the electrical signal amplified by the second amplifier is greater than the preset critical level, may select a peak detection signal corresponding to the electrical signal amplified by the first amplifier as an optimum peak detection signal. On the other hand, when the level of the electrical signal amplified by the second amplifier is not greater than the preset critical level, the selector 150 may select a peak detection signal corresponding to the electrical signal amplified by the second amplifier as an optimum peak detection signal.

Accordingly, the distance measuring device 100 measures a distance to the object OB by using a peak detection signal of an optimum electrical signal from among electrical signals respectively amplified with different gains, and thus, it is possible to perform accurate distance measurement with respect to the object OB. For example, when the object OB is nearby or has a large refractive index, an electrical signal amplified by using a high gain may be saturated, and thus, a peak detection signal of the electrical signal amplified by using a high gain may be inaccurate in distance measurement. In this case, the distance measuring device 100 may determine a level of the electrical signal amplified by using a high gain as being greater than a preset critical level, and as a result, may accurately measure a distance to the object OB by selecting a peak detection signal of an electrical signal amplified by using a low gain. On the other hand, when the object OB is far away, the electrical signal amplified by using a low gain is weak in signal magnitude and thus may be inaccurate in distance measurement. In this case, the distance measuring device 100 may determine the level of the electrical signal amplified by using a high gain as being not greater than the preset critical level, and as a result, may accurately measure a distance to the object OB by selecting a peak detection signal of the electrical signal amplified by using a high gain.

The processor 160 may control an operation of each of the components of the distance measuring device 100. The distance measuring device 100 may include a memory that stores a program and other data for an operation performed by the processor 160.

The processor 160 may measure a distance to the object OB by using the optimum peak detection signal selected by the selector 150. According to an embodiment, the processor 160 may include a time-to-digital converter (TDC) measuring a time period between a radiation time of the light radiated by the light source 110 and a peak detection time of the optimum peak detection signal. The processor 160 may measure a distance to the object OB based on the time measured by the TDC. According to another embodiment, the processor 160 may include an analog-to-digital converter (ADC) converting the optimum peak detection signal, which is an analog signal, into a digital signal. The processor 160 may measure a distance to the object OB by processing the digital signal converted by the ADC. Alternatively, the TDC and the ADC may be disposed outside the processor 160, and may convert an analog signal inputted from the selector 150 into a digital signal and then provide the digital signal to the processor 160. A method of measuring a distance by using a peak is a well-known technique in the art, and thus, a detailed description thereof is omitted.

The distance measuring device 100 may select an optimum peak detection signal from among the plurality of peak detection signals in an analog domain and measure a distance to the object OB by using the optimum peak detection signal in a digital domain. In detail, the plurality of amplifiers 130, the plurality of peak detectors, and the selector 150 may select the optimum peak detection signal by processing the signals in the analog domain and the processor 160 may measure the distance to the object OB by processing the optimum peak detection signal in the digital domain. The distance measuring device 100 performs a process of selecting a peak detection signal of an optimum electrical signal in the analog domain instead of the digital domain and thus may be effective in terms of hardware cost. For example, the processor 160 may include only one TDC processing the optimum peak detection signal instead of a plurality of TDCs processing the plurality of peak detection signals, and thus may reduce hardware cost.

Figure 2:
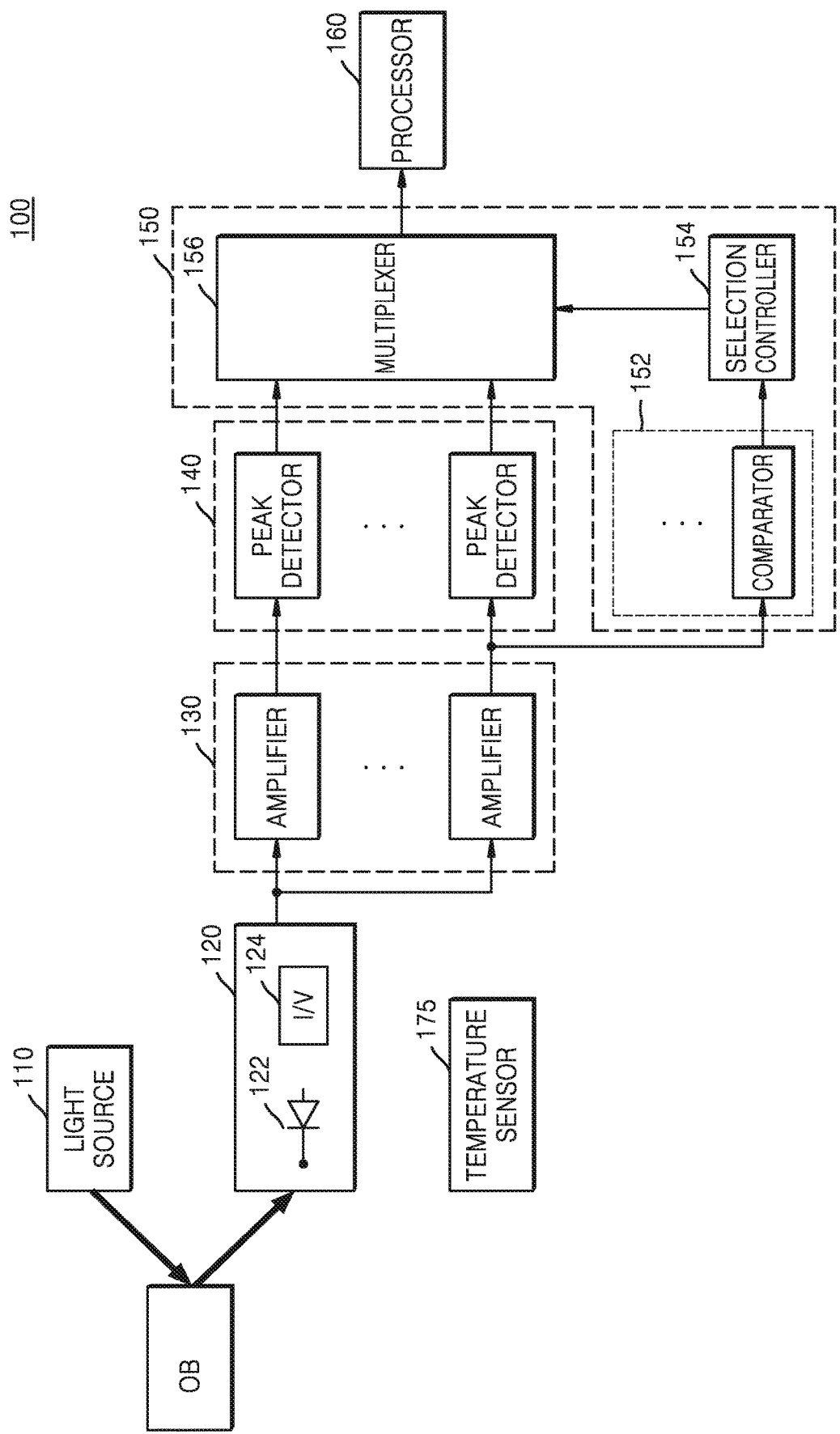
FIG. 2 is a diagram illustrating an embodiment of the distance measuring device in detail.

FIG. 2 is a diagram illustrating a concrete embodiment of the distance measuring device 100.

The light receiver 120 may include a light detector 122 that outputs an electrical signal, for example, a current, corresponding to light, and a current-voltage (UV) conversion circuit 124 that converts the current output by the light detector 122 into a voltage. In addition, the light receiver 120 may further include a lens that focuses light reflected from the object OB and a filter (e.g., a high-pass filter) that filters an electrical signal of a certain frequency.

The light detector 122 may be a light receiving element and may operate by a bias voltage Vbias applied thereto. For example, the light detector 122 may include an avalanche photo diode (APD) or a single photon avalanche diode (S PAD).

The selector 150 may include at least one comparator 152, a selection controller 154, and a multiplexer 156.

The comparator 152 may output a comparison result signal by comparing a level of at least one of a plurality of amplified electrical signals with at least one critical level. In other words, when a level of an amplified electrical signal is greater than a critical level, the comparator 152 may output a comparison result signal as a pulse signal.

The processor 160 may control a critical level of the comparator 152. In addition, when the comparator 150 includes a plurality of comparators, the processor 160 may change critical levels of each of the plurality of comparators 152 so as to have different values from each other. The distance measuring device 100 may further include a temperature sensor 175 that senses ambient temperature of the light receiver 120, and thus, the processor 160 may control a critical level of the comparator 152, based on a sensing result of the temperature sensor 175. In addition, the processor 160 may control a critical level of the comparator 152, based on other factors that influence an operation of the light receiver 120.

The selection controller 154 may receive a comparison result signal from the comparator 152 and then may output a selection control signal corresponding to the comparison result signal. For example, the selection controller 154 may include a delay flip-flop (D flip-flop).

The multiplexer 156 may select an optimum peak detection signal from among a plurality of peak detection signals according to the at least one selection control signal. In other words, the multiplexer 156 may select an optimum peak detection signal from among a plurality of peak detection signals input from the plurality of peak detectors 140 according to a selection control signal input from the selection controller 154.

Figure 3:
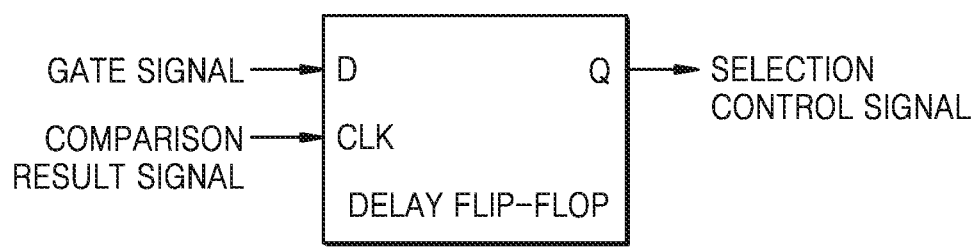
FIG. 3 is a diagram illustrating an embodiment in which a selection controller operates.
Figure 3:
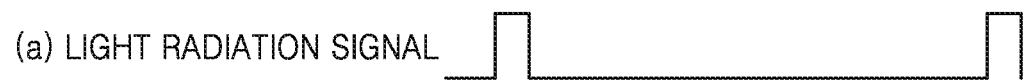
Figure 3:
Figure 3:
Figure 3:
Figure 3:

FIG. 3 is a diagram illustrating an embodiment in which the selection controller 154 operates.

As shown in FIG. 3, the selection controller 154 may include a D flip-flop. Although FIG. 3 shows one D flip-flop, the disclosure is not limited thereto, and the selection controller 154 may include a plurality of D flip-flops.

A signal denoted by a solid line in (a) of FIG. 3 indicates a light radiation signal regarding a time point when the light source 110 radiates light. A signal denoted by a solid line in (b) of FIG. 3 indicates a gate signal which is set according to the light radiation signal of (a). For example, the gate signal may occur during a certain time period after the time point when the light source 110 radiates light. In other words, the gate signal may maintain a high-level pulse during a certain time period after the time point when the light source 110 radiates light. A signal denoted by a solid line in (c) of FIG. 3 indicates an output comparison result signal that the comparator 152 compares a level of an amplified electrical signal amplified by the amplifier with a critical level.

As illustrated in (b) to (d) of FIG. 3, a D flip-flop may output a selection control signal of (d) according to an input gate signal of (b) and an input comparison result signal of (c). In detail, while a gate signal is input to the D flip-flop, a comparison result signal is input to the D flip-flop, and accordingly, the D flip-flop may output a selection control signal when the comparison result signal is input. In addition, the D flip-flop may output the selection control signal until input of the gate signal is stopped. In other words, from a time when the comparison result signal is input to a time when input of the gate signal is stopped, the D flip-flop may output a selection control signal having a high-level pulse.

A signal denoted by a solid line in (e) of FIG. 3 indicates a peak detection signal output from one of the plurality of peak detectors 140. During a process in which the peak detector 140 detects a peak of an amplified electrical signal, a certain time period may be delayed, and thus, the peak detection signal of (e) may occur temporally later than the comparison result signal of (c). In other words, although electrical signals amplified by the plurality of amplifiers 130 are respectively input to the comparator 152 and the plurality of peak detectors 140, the peak detection signal may occur temporarily later than the comparison result signal since the plurality of peak detectors 140 may be delayed for a certain time in the process of detecting the peak of the amplified electrical signal. For example, the peak detector may detect a peak of an amplified electrical signal using the CFD method and generate the peak detection signal of (e) which is later than the comparison result signal of (c). Accordingly, according to the selection control signal of (d) which may be held at a high-level pulse until the peak detection signal of (e) occurs, the multiplexer 156 may select the peak detection signal of (e).

For example, the plurality of amplifiers 130 may include a first amplifier having a low gain (e.g., a first gain) and a second amplifier having a high gain (e.g., a second gain higher than the first gain), the plurality of peak detectors 140 may include a first peak detector connected to the first amplifier and a second peak detector connected to the second amplifier, and the comparator 152 may include a first comparator connected to the second amplifier. When a level of an electrical signal amplified by the second amplifier is greater than a critical level, the first comparator may generate a comparison result signal of (c), and may input the generated comparison result signal of (c) to the D flip-flop.

Subsequently, the D flip-flop may generate a selection control signal of (d) according to a gate signal of (b) and a comparison result signal of (c), and may input the generated selection control signal of (d) to the multiplexer 156. Subsequently, according to the selection control signal of (d), from among a peak detection signal detected by the first peak detector and a peak detection signal detected by the second peak detector, the multiplexer 156 may select the peak detection signal detected by the first peak detector as an optimum peak detection signal. On the other hand, when the level of an electrical signal amplified by the second amplifier is not greater than the critical level, the first comparator may not generate a comparison result signal having a high-level pulse as (c), but may generate a comparison result signal which may be held at a low-level pulse. Subsequently, the selection controller 154 may not generate a selection control signal having a high-level pulse as (d), but may generate a selection control signal which may be held at a low-level pulse. In this case, the multiplexer 156 may select the peak detection signal detected by the second peak detector as an optimum peak detection signal among the peak detection signals respectively detected by the first peak detector and the second peak detector according to the selection control signal which may be held at a low-level pulse.

Figure 4:
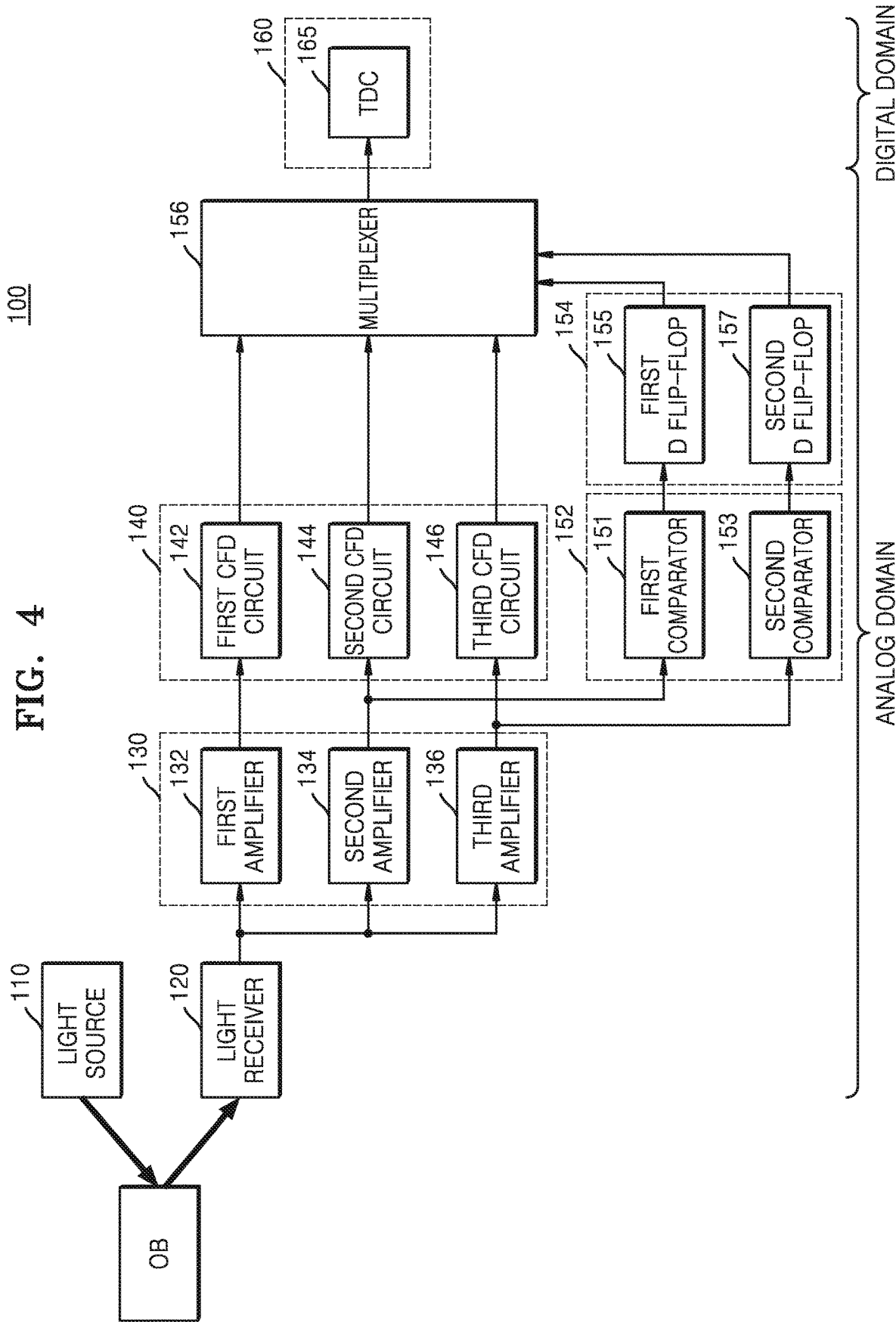
FIG. 4 is a diagram illustrating an embodiment of the distance measuring device in detail.

FIG. 4 is a diagram illustrating a more concrete embodiment of the distance measuring device 100.

The plurality of amplifiers 130 may include a first amplifier 132, a second amplifier 134, and a third amplifier 136. The first amplifier 132 may amplify an electrical signal output by the light receiver 120 by using a first gain, the second amplifier 134 may amplify the electrical signal output by the light receiver 120 by using a second gain, and the third amplifier 136 may amplify the electrical signal output by the light receiver 120 by using a third gain. In the present embodiment, the first gain is a gain having a low value, the second gain is a gain having a middle value, and the third gain is a gain having a high value, but the disclosure is not limited thereto. The terms "low value," "middle value," "high value" may indicate relative values. The third gain is higher than the first gain and the second gain, and the second gain is higher the first gain.

The plurality of peak detectors 140 may include a first CFD circuit 142, a second CFD circuit 144, and a third CFD circuit 146. The first CFD circuit 142 may detect a peak from the electrical signal amplified by the first amplifier 132 by using the CFD method, and may output the peak detected by using a comparator as a peak occurrence signal. Likewise, the second CFD circuit 144 may output a peak occurrence signal by detecting a peak from the electrical signal amplified by the second amplifier 134, and the third CFD circuit 146 may output a peak occurrence signal by detecting a peak from the electrical signal amplified by the third amplifier 136.

The comparator 152 may include a first comparator 151 and a second comparator 153. The first comparator 151 may output a comparison result signal by comparing a level of the electrical signal amplified by the second amplifier 134 with a preset first critical level. Likewise, the second comparator 153 may output a comparison result signal by comparing a level of the electrical signal amplified by the third amplifier 136 with a preset second critical level.

The selection controller 154 may include a first D flip-flop 155 and a second D flip-flop 157. The first D flip-flop 155 may output a selection control signal corresponding to the comparison result signal caused by the first comparator 151.

Likewise, the second D flip-flop 157 may output a selection control signal corresponding to the comparison result signal caused by the second comparator 153.

The multiplexer 156 may select an optimum peak detection signal from among peak detection signals of the first to third CFD circuits 142 to 146, based on the selection control signal caused by each of the first D flip-flop 155 and the second D flip-flop 157. In detail, according to whether or not the selection control signal of the first D flip-flop 155 occurs and whether or not the selection control signal of the second D flip-flop 157 occurs, the multiplexer 156 may select an optimum peak detection signal from among peak detection signals of the first to third CFD circuits 142 to 146.

The processor 160 may include a time-to-digital converter (TDC) 165. The TDC 165 may receive an optimum peak detection signal from the multiplexer 156. The TDC 165 may measure a time period between a radiation time of the light radiated by the light source 110 and a peak detection time of the optimum peak detection signal and the processor 160 may measure a distance to the object OB based on the time measured by the TDC 165. In addition, according to another embodiment, the processor 160 may include an analog-to-digital converter (ADC). The ADC may convert an optimum peak detection signal input from the multiplexer 156 into a digital signal and the processor 160 may measure a distance to the object OB by processing the digital signal converted by the ADC. Alternatively, the TDC 165 and the ADC may be disposed outside the processor 160, and may convert an analog signal inputted from the multiplexer 156 into a digital signal and then provide the digital signal to the processor 160.

The plurality of amplifiers 130 and the plurality of peak detectors 140 may correspond to an analog front end operating in an analog domain. In particular, The multiplexer 156 may select an optimum peak detection signal from among a plurality of peak detection signals in the analog domain. Subsequently, the processor 160 may measure a distance of the object OB by using the optimum peak detection signal in a digital domain. According, the distance measuring device 100 may perform a process of selecting a peak detection signal of an optimum electrical signal in the analog domain instead of the digital domain, and a plurality of TDCs or a plurality of ADCs are not required while only one TDC or ADC is required, and thus may be effective in terms of hardware cost. For example, referring to FIG. 4, the distance measuring device 100 may not require three TDCs corresponding to three amplifiers and three peak detectors and may measure a distance of the object OB via only one TDC or one ADC, and thus may reduce the hardware cost.

Figure 5:
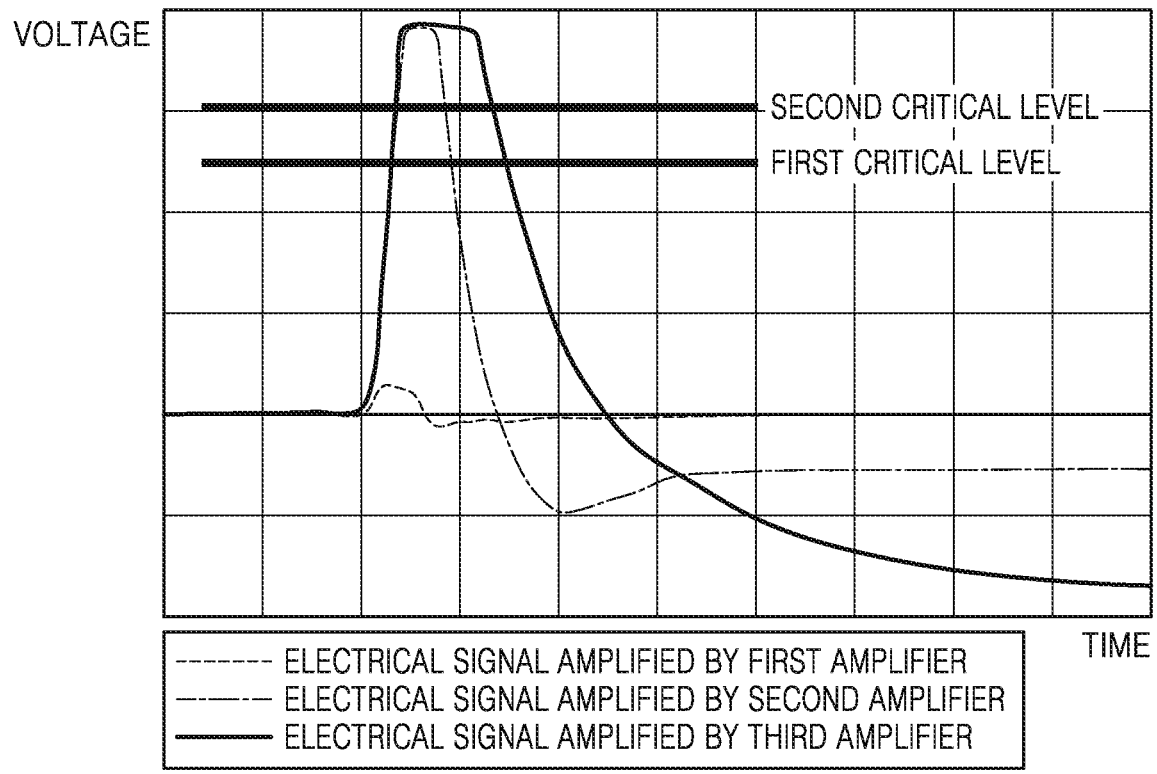
FIGS. 5 to 7 illustrate embodiments in which the distance measuring device of FIG. 4 operates.
Figure 6:
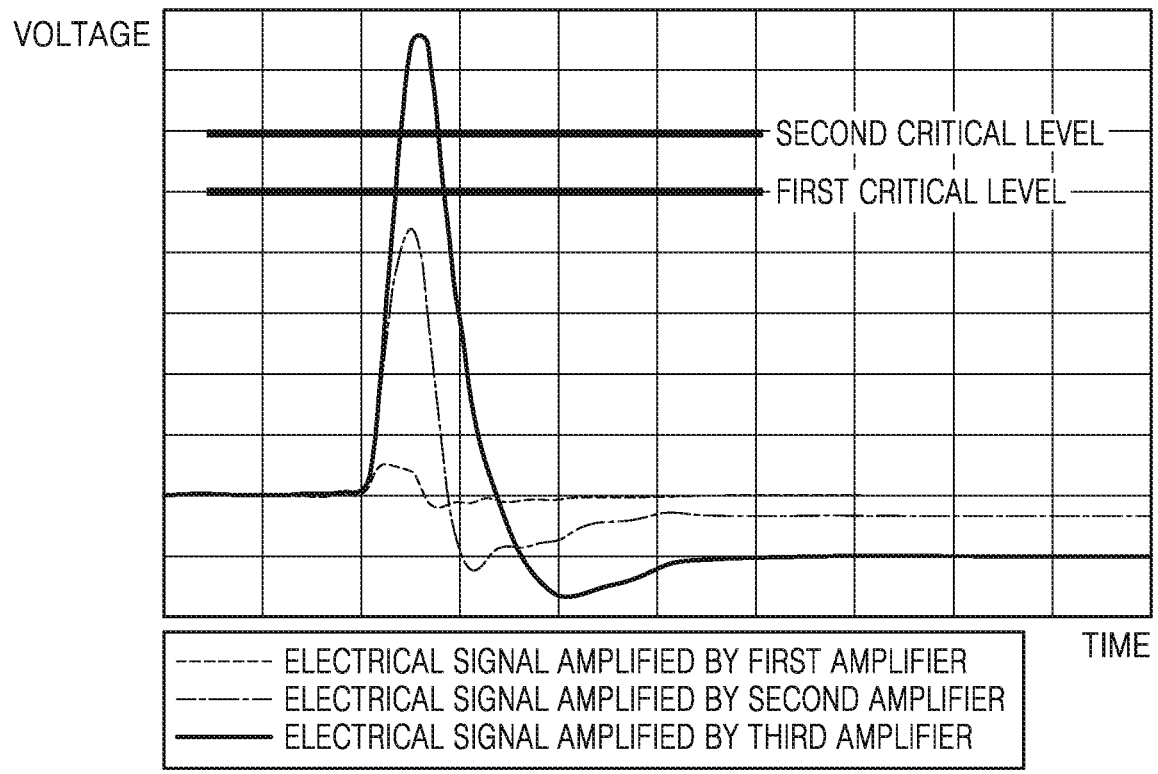
Figure 7:
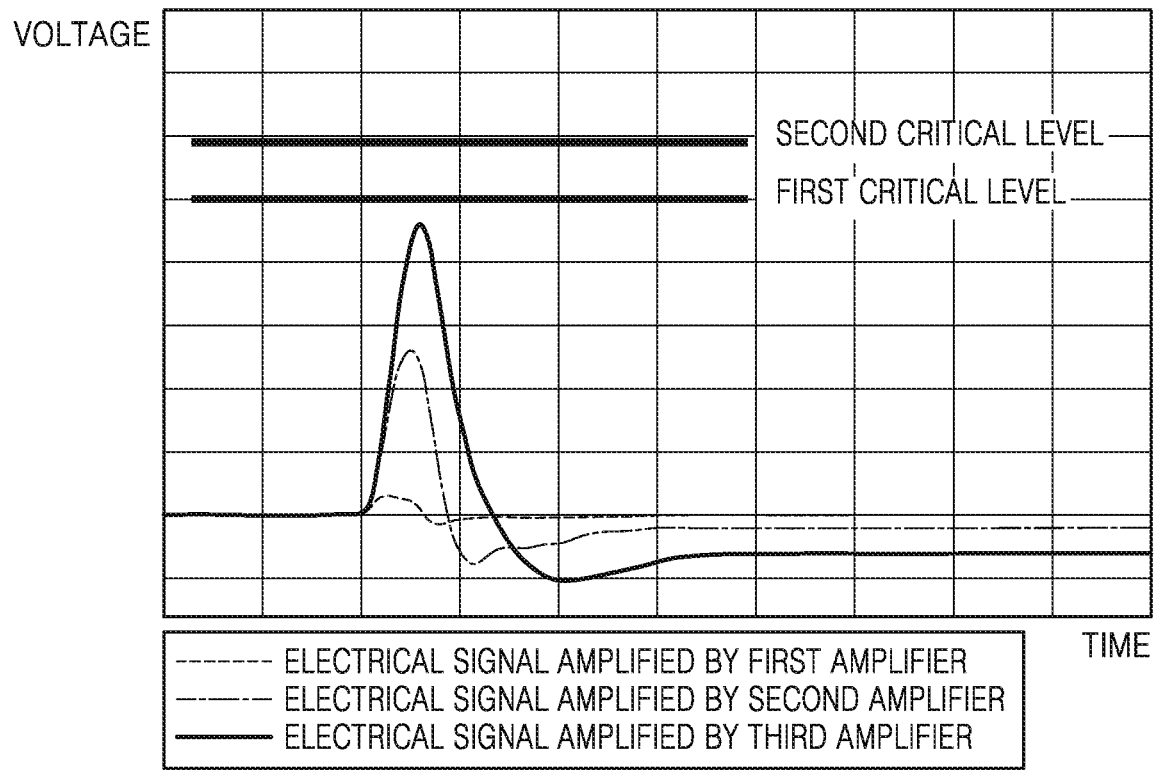

FIGS. 5 to 7 illustrate embodiments in which the distance measuring device 100 of FIG. 4 operates.

FIG. 5 illustrates an embodiment in which the multiplexer 156 selects a peak detection signal of an electrical signal amplified by the first amplifier 132 as an optimum peak detection signal.

Referring to FIG. 5, both electrical signals amplified by the second amplifier 134 and the third amplifier 136 are greater than a first critical level and a second critical level, and accordingly, each of the first comparator 151 and the second comparator 153 may generate a comparison result signal. For reference, although FIGS. 5 to 7 illustrate whether a comparison result signal is generated or not as '1' and '0', the disclosure is not limited thereto. Subsequently, in response to the comparison result signal of each of the first comparator 151 and the second comparator 153, each of the first D flip-flop 155 and the second D flip-flop 157 may generate a selection control signal and input the selection control signal to the multiplexer 156. As a result, according to the selection control signal of each of the first D flip-flop 155 and the second D flip-flop 157, the multiplexer 156 may select a peak detection signal of an electrical signal amplified by the first amplifier 132 as an optimum peak detection signal. In other words, the multiplexer 156 may select a peak detection signal of the first CFD circuit 142 as an optimum peak detection signal.

FIG. 6 illustrates an embodiment in which the multiplexer 156 selects a peak detection signal of an electrical signal amplified by the second amplifier 134 as an optimum peak detection signal.

Referring to FIG. 6, when only an electrical signal amplified by the third amplifier 136 is greater than the second critical level, the first comparator 151 may not generate a comparison result signal, and only the second comparator 153 may generate a comparison result signal. Subsequently, in response to the comparison result signal of the second comparator 153, only the second D flip-flop 157 may generate a selection control signal and input the selection control signal to the multiplexer 156. As a result, according to the selection control signal of the second D flip-flop 157, the multiplexer 156 may select a peak detection signal of an electrical signal amplified by the second amplifier 134 as an optimum peak detection signal. In other words, the multiplexer 156 may select a peak detection signal of the second CFD circuit 144 as an optimum peak detection signal.

FIG. 7 illustrates an embodiment in which the multiplexer 156 selects a peak detection signal of an electrical signal amplified by the third amplifier 136 as an optimum peak detection signal.

Referring to FIG. 7, when neither of electrical signals amplified by the second amplifier 134 and the third amplifier 136 are greater than the first critical level and the second critical level, each of the first comparator 151 and the second comparator 153 does not generate a comparison result signal. Subsequently, the first D flip-flop 155 and the second D flip-flop 157 do not generate selection control signals, either. As a result, as selection control signals of the first D flip-flop 155 and the second D flip-flop 157 are not input to the multiplexer 156, the multiplexer 156 may select a peak detection signal of an electrical signal amplified by the third amplifier 136 as an optimum peak detection signal. In other words, the multiplexer 156 may select a peak detection signal of the third CFD circuit 146 as an optimum peak detection signal.

Figure 8:
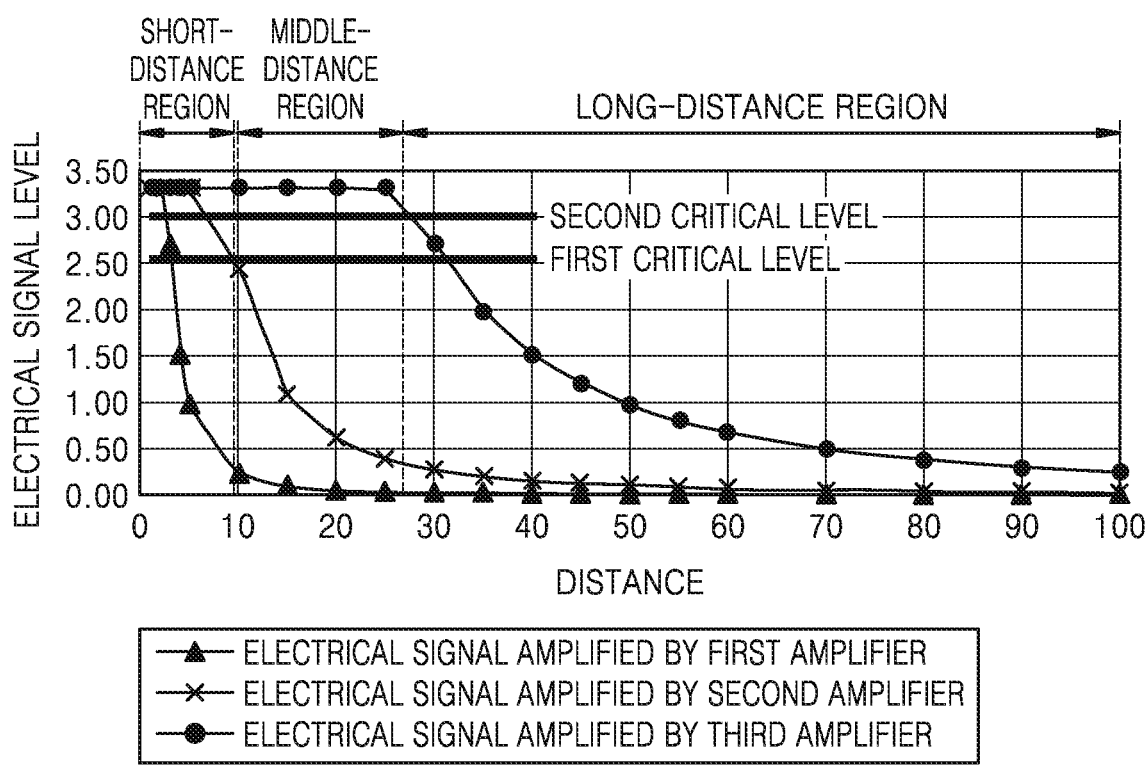
FIG. 8 illustrates another embodiment in which the distance measuring device of FIG. 4 operates.

FIG. 8 illustrates another embodiment in which the distance measuring device 100 of FIG. 4 operates.

Since the first comparator 151 and the second comparator 153 operate according to a first critical level and a second critical level that are previously set, the distance measuring device 100 may select a peak detection signal of an electrical signal amplified by one of the first to third amplifiers 132 to 136, according to a distance to the object OB to be measured. In detail, when the object OB is in a short-distance region, an electrical signal amplified by the second amplifier 134 and an electrical signal amplified by the third amplifier 136 have sufficiently large magnitudes to be greater than the first critical level and the second critical level, and thus, the distance measuring device 100 measures a distance to the object OB by using an electrical signal amplified by the first amplifier 132. In addition, when the object OB is in a middle-distance region, the electrical signal amplified by the third amplifier 136 is greater than the second critical level, whereas the electrical signal amplified by the second amplifier 134 is not greater than the first critical level. Thus, the distance measuring device 100 measures a distance to the object OB by using the electrical signal amplified by the second amplifier 134. Likewise, when the object OB is in a long-distance region, the electrical signal amplified by the second amplifier 134 and the electrical signal amplified by the third amplifier 136 are not greater than either of the first critical level and the second critical level, and thus, the distance measuring device 100 measures a distance to the object OB by using the electrical signal amplified by the third amplifier 136.

In addition, the distance measuring device 100 may set each of a first critical level of the first comparator 151 and a second critical level of the second comparator 153, based on a distance to the object OB to be measured. In other words, the distance measuring device 100 may set each of a first critical level of the first comparator 151 and a second critical level of the second comparator 153 to use electrical signals respectively amplified by the first to third amplifiers 132 to 136 with respect to the short-distance to long-distance regions, respectively. In addition, the distance measuring device 100 may set each of the first critical level and the second critical level to set a distance basis of the short-distance region, the middle-distance region, and the long-distance region.

Figure 9:
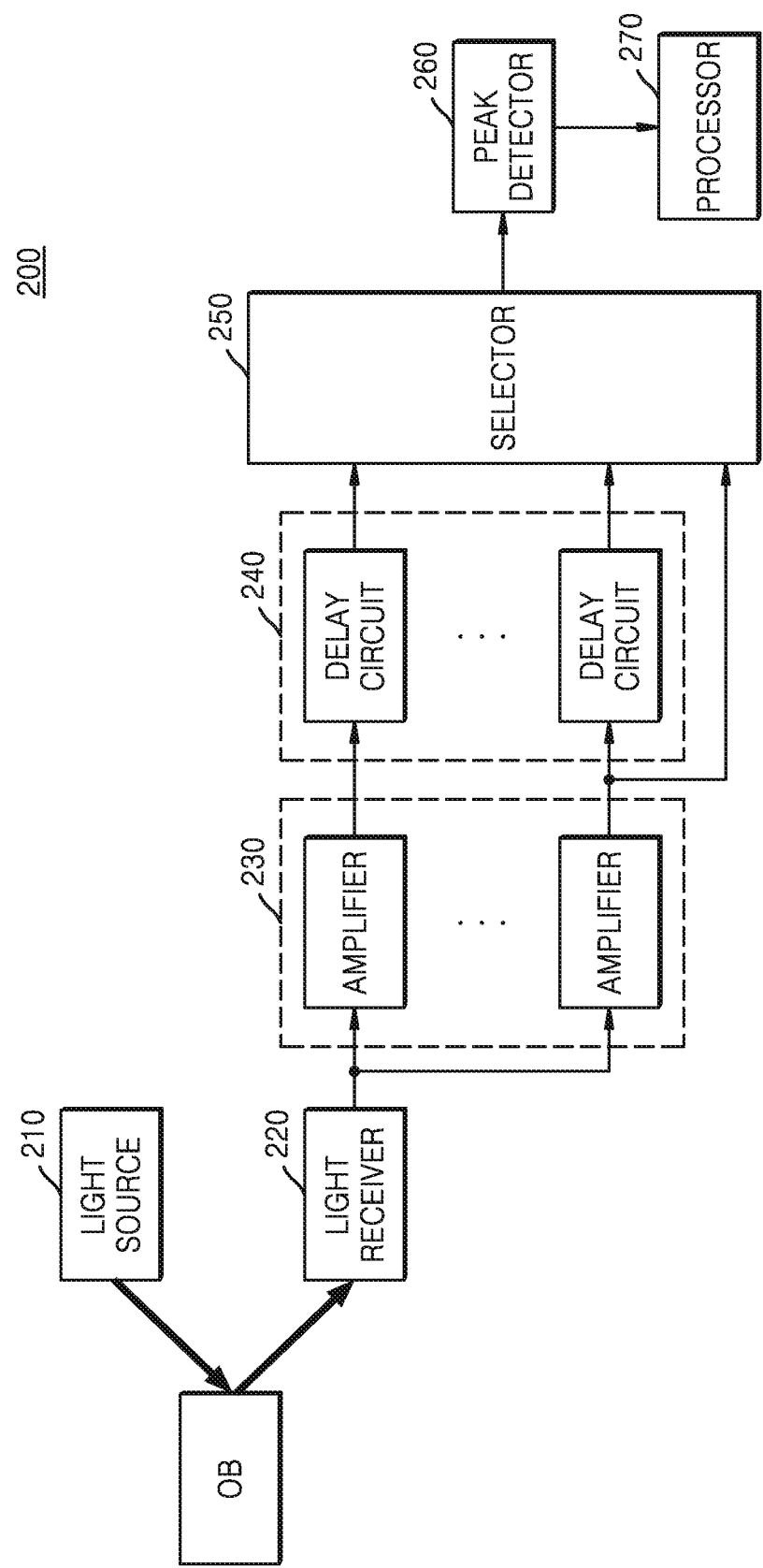
FIG. 9 is a diagram illustrating a distance measuring device according to another embodiment.

FIG. 9 is a diagram illustrating a distance measuring device 200 according to another embodiment.

The distance measuring device 200 may include a light source 210, a light receiver 220, a plurality of amplifiers 230, a plurality of delay circuits 240, a selector 250, a peak detector 260, and a processor 270.

The light source 210 may radiate light toward the object OB. The light source 210 may include the light source 110 of FIG. 1, and thus, a repeated description thereof is omitted below.

The light receiver 220 may output an electrical signal by detecting light reflected or scattered by the object OB. The light receiver 220 may include the light receiver 120 of FIGS. 1 and 2, and thus, a repeated description thereof is omitted below.

The plurality of amplifiers 230 may generate a plurality of amplified electrical signals by amplifying the electrical signal with different gains, respectively. The plurality of amplifiers 230 may include the plurality of amplifiers 130 of FIG. 1, and thus, a repeated description thereof is omitted below.

The plurality of delay circuits 240 may generate a plurality of delayed electrical signals by delaying each of the plurality of amplified electrical signals during a certain time period. In other words, the plurality of delay circuits 240 may respectively generate a plurality of delayed electrical signals by delaying each of a plurality of amplified electrical signals output by the plurality of amplifiers 230 during a certain time period.

The selector 250 may select an optimum delayed electrical signal from among the plurality of delayed electrical signals, based on a level of at least one of the plurality of amplified electrical signals. In detail, the selector 250 may select an optimum delayed electrical signal from among the plurality of delayed electrical signals by determining whether a level of at least one of the plurality of amplified electrical signals is greater than a preset critical level. For example, the selector 250 may determine, via a comparator, whether a level of an amplified electrical signal is greater than a preset critical level.

For example, the plurality of amplifiers 230 may include a first amplifier that amplifies an electrical signal by using a low gain and a second amplifier that amplifies an electrical signal by using a high gain, and the plurality of delay circuits 240 may include a first delay circuit that delays the electrical signal amplified by the first amplifier and a second delay circuit that delays the electrical signal amplified by the second amplifier. In this case, the selector 250 may determine whether a level of the electrical signal amplified by the second amplifier is greater than a preset critical level, and when the level of the electrical signal amplified by the second amplifier is greater than the preset critical level, may select the electrical signal delayed by the first delay circuit as an optimum delayed electrical signal. On the other hand, when the level of the electrical signal amplified by the second amplifier is not greater than the preset critical level, the selector 250 may select the electrical signal delayed by the second delay circuit as an optimum delayed electrical signal.

In addition, the selector 250 may include a comparator, a selection controller, and a multiplexer. The comparator may output a comparison result signal by comparing a level of at least one of the plurality of amplified electrical signals with at least one critical level. The selection controller may receive the comparison result signal from the comparator, and subsequently, may output a selection control signal corresponding to the comparison result signal. The multiplexer may select an optimum delayed electrical signal from among the plurality of delayed electrical signals according to the selection control signal. The comparator, the selection controller, and the multiplexer may include the comparator 152, the selection controller 154, and the multiplexer 156 of FIGS. 2 to 8, and thus, a repeated description thereof is omitted below.

The peak detector 260 may detect a peak of the optimum delayed electrical signal. The peak detector 260 may detect the peak by detecting a central position of the electrical signal. Alternatively, the peak detector 260 may detect the peak by analogically detecting a width of the electrical signal. Alternatively, the peak detector 260 may detect the peak by using the CFD method.

The processor 270 may measure a distance to the object OB by using the peak detected by the peak detector 260. According to an embodiment, the processor 270 may include a TDC which measures a time period between a radiation time of the light radiated by the light source 210 and a detection time of the peak detected by the peak detector 260 and measure a distance to the object OB based on the time measured by the TDC. According to another embodiment, the processor 270 may include a ADC converting a peak detection signal, which is an analog signal, into a digital signal. The processor 270 may measure a distance to the object OB by processing the digital signal converted by the ADC. A method of measuring a distance by using a peak is a well-known technique in the art, and thus, a detailed description thereof is omitted.

The distance measuring device 200 may detect a peak of an optimum delayed electrical signal in the analog domain and measure a distance to the object OB by using the optimum delayed electrical signal in the digital domain. In detail, the plurality of amplifiers 230, the plurality of delay circuits 240, the selector 250, and the peak detector 260 may process signals in the analog domain to detect the peak of the optimum delayed electrical signal, and the processor 270 may process the peak of the optimum delayed electrical signal in the digital domain to measure the distance to the object OB. Accordingly, the distance measuring device 200 may perform a process of detecting the peak of the optimum delayed electrical signal in the analog domain instead of the digital domain, and thus may be more effective in terms of hardware cost. For example, the processor 270 may include only one TDC processing the peak of the optimum delayed electrical signal instead of a plurality of TDCs processing the optimum delayed electrical signals, and thus may reduce the hardware cost.

Figure 10:
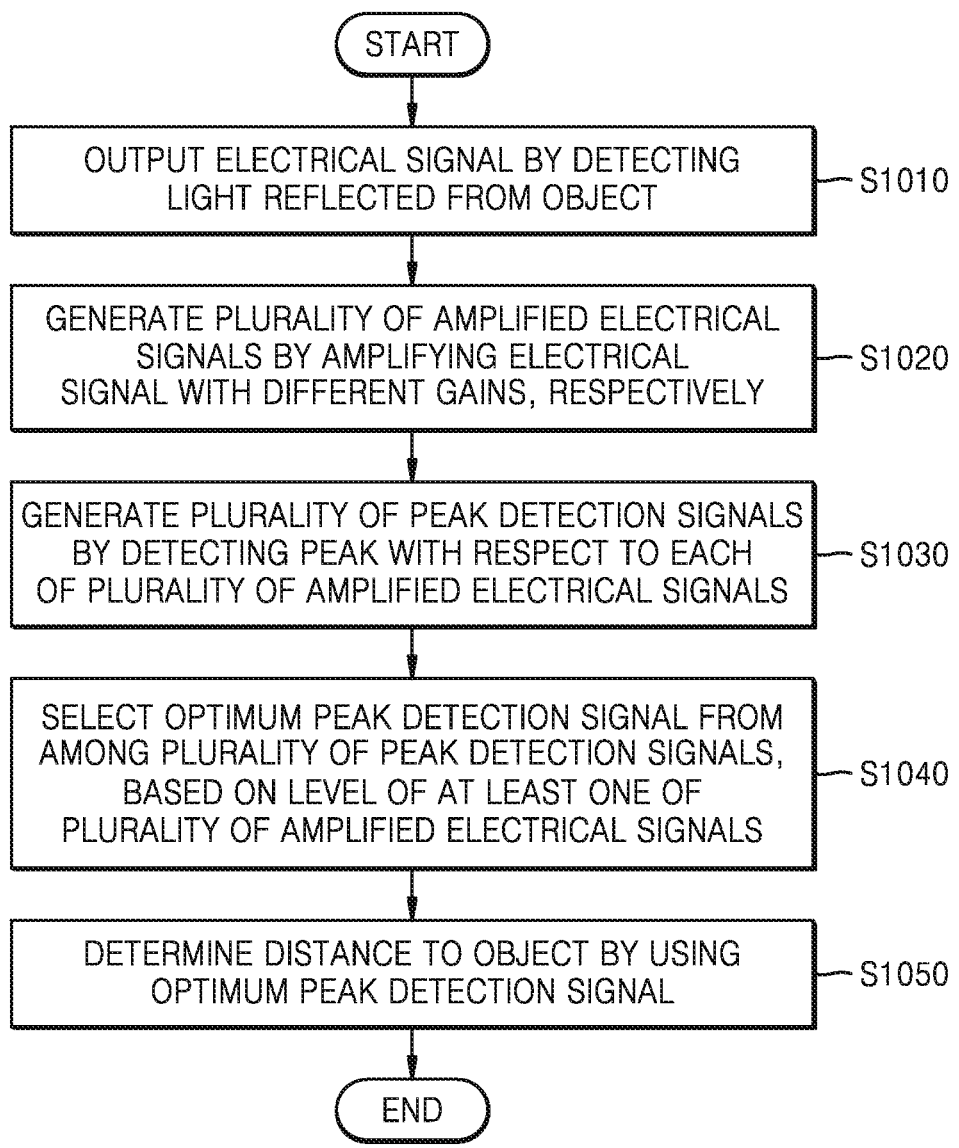
FIG. 10 is a diagram for explaining a distance measuring method according to an embodiment.

FIG. 10 is a diagram for explaining a distance measuring method according to an embodiment.

The method illustrated in FIG. 10 may be performed by each component of the distance measuring device 100 of FIGS. 1 to 8, and a repeated description thereof is omitted below.

In operation S1010, the distance measuring device 100 may output an electrical signal by detecting light reflected or scattered by the object OB. In detail, the distance measuring device 100 may radiate light toward the object OB and may output an electrical signal by detecting light reflected or scattered by the object OB. For example, the distance measuring device 100 may convert light reflected or scattered by the object OB into a voltage signal.

In operation S1020, the distance measuring device 100 may generate a plurality of amplified electrical signals by amplifying the electrical signal with different gains, respectively.

In operation S1030, the distance measuring device 100 may generate a plurality of peak detection signals by detecting a peak with respect to each of the plurality of amplified electrical signals. For example, the distance measuring device 100 may generate a plurality of peak detection signals by using the CFD method.

In operation S1040, the distance measuring device 100 may select an optimum peak detection signal from among the plurality of peak detection signals, based on a level of at least one of the plurality of amplified electrical signals. In detail, the distance measuring device 100 may select an optimum peak detection signal from among the plurality of peak detection signals by determining whether a level of at least one of the plurality of amplified electrical signals is greater than a preset critical level.

In detail, the distance measuring device 100 may output a comparison result signal by comparing a level of at least one of the plurality of amplified electrical signals with at least one critical level. Subsequently, the distance measuring device 100 may output a selection control signal corresponding to the comparison result signal. For example, the distance measuring device 100 may output the selection control signal by using a D flip-flop. Subsequently, the distance measuring device 100 may select an optimum peak detection signal from among the plurality of peak detection signals according to the selection control signal.

In operation S1050, the distance measuring device 100 may measure a distance to the object OB by using the selected optimum peak detection signal.

According to the present embodiments, a distance measuring device measures a distance to an object by using a peak detection signal of an optimum electrical signal from among electrical signals respectively amplified with different gains, and thus, it is possible to perform accurate distance measurement with respect to the object OB. In addition, the distance measuring device performs a progress of selecting of the peak detection signal of the optimum electrical signal in an analog domain instead of a digital domain, and thus, may be more effective in terms of hardware cost.

The devices described herein may include a processor, a memory for storing program data and executing it, a permanent storage unit such as a disk drive, a communications port for handling communication with external devices, and user interface devices, including a touch panel, keys, buttons, etc. For example, when software modules or algorithms are involved, these software modules may be stored as computer-readable code executable on the processor or program instructions in a computer-readable recording medium. Examples of the computer-readable recording medium include magnetic storage media (e.g., read-only memory (ROM), random-access memory (RAM), floppy disks, hard disks, etc.), and optical recording media (e.g., CD-ROM, or digital versatile disc (DVD)). The computer-readable recording medium can also be distributed over network-coupled computer systems so that the computer-readable code is stored and executed in a distributive manner. This media can be read by the computer, stored in the memory, and executed by the processor.

The present embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. The functional blocks may be implemented in algorithms that are executed on one or more processors. Furthermore, the present embodiment described herein could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples and are not intended to otherwise limit the scope of the present invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a", "an", "the", and similar referents in the context of describing the present invention (especially in the context of the following claims) are to be construed to cover both the singular and the plural. Furthermore, recitation of ranges of values herein are merely intended to serve as each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. It will be apparent to one of ordinary skill in the art that numerous modifications and adaptations may be made according to design conditions or factors without departing from the accompanying claims or their equivalents.

What is claimed is:

1. A distance measuring device comprising:
a light receiver configured to output an electrical signal by detecting light reflected by an object;
a plurality of amplifiers configured to generate a plurality of amplified electrical signals by amplifying the electrical signal with different gains, respectively, wherein the plurality of amplifiers comprises:
   a lowest gain amplifier which has a lowest gain among the different gains, and is configured to generate a first amplified electrical signal;
   a highest gain amplifier which has a highest gain among the different gains, and is configured to generate a second amplified electrical signal; and
   at least one intermediate gain amplifier which has an intermediate gain that is higher than the lowest gain and lower than the highest gain, and is configured to generate a third amplified electrical signal;
a plurality of peak detectors configured to generate a plurality of peak detection signals by detecting a peak from each of the plurality of amplified electrical signals, wherein the plurality of peak detection signals comprises a first peak detection signal, a second peak detection signal, and a third peak detection signal that are detected from the first amplified electrical signal, the second amplified electrical signal, and the third amplified electrical signal;
a selector configured to select, as an optimum peak detection signal,
   the first peak detection signal based on both the second peak detection signal and the third peak detection signal being greater than at least one critical level,
   the second peak detection signal based on the second peak detection signal being less than or equal to the at least one critical level, and the third peak detection signal being greater than the at least one critical level, and
   the third peak detection signal based on neither the second peak detection signal nor the third peak detection signal being greater than the at least one critical level; and
a processor configured to measure a distance to the object based on the selected optimum peak detection signal.

2. The distance measuring device of claim 1, wherein the processor comprises a time-to-digital converter (TDC) or an analog-to-digital converter (ADC) and is further configured to receive the plurality of peak detection signals and process the optimum peak detection signal in an digital domain, and
wherein the plurality of amplifiers, the plurality of peak detectors, and the selector operate in an analog domain.

3. The distance measuring device of claim 1, further comprising a temperature sensor configured to sense an ambient temperature of the light receiver,
wherein the processor is further configured to control the at least one critical level according to the ambient temperature of the light receiver.

4. The distance measuring device of claim 1, wherein the selector comprises:
a first comparator configured to output a first comparison result signal by comparing the second peak detection signal with the at least one critical level;
a second comparator configured to output a second comparison result signal by comparing the third peak detection signal with the at least one critical level;
a first delay flip-flop (D flip-flop) configured to output a first selection control signal corresponding to the first comparison result signal;
a second D flip-flop configured to output a second selection control signal corresponding to the second comparison result signal; and
a multiplexer configured to select the optimum peak detection signal from among the plurality of peak detection signals according to the first selection control signal and the second selection control signal.

5. The distance measuring device of claim 4, wherein the multiplexer is further configured to:
receive the first peak detection signal, the second peak detection signal, the third peak detection signal, the first comparison result, and the second comparison result, and
select the optimum peak detection signal, among the first peak detection signal, the second peak detection signal, the third peak detection signal, based on the first comparison result, and the second comparison result.

6. The distance measuring device of claim 1, wherein the light receiver comprises:
a light detector comprising at least one of an avalanche photo diode (APD) and a single photon avalanche diode (SPAD) to output a current by detecting the light; and
a current-voltage converter configured to the current to a voltage and output the voltage as the electrical signal.

7. The distance measuring device of claim 1, wherein each of the plurality of peak detectors is configured to detect the peak by using a constant fraction discriminator (CFD) method.

8. The distance measuring device of claim 1, further comprising a light source configured to radiate light in a form of a laser pulse to the object.

9. The distance measuring device of claim 8, wherein the processor comprises a time-to-digital converter (TDC) or an analog-to-digital converter (ADC) and is further configured to receive the peak of the delayed electrical signal, and process the peak of the selected delayed electrical signal, in an digital domain, and
wherein the plurality of amplifiers, the plurality of peak detectors, and the selector operate in an analog domain.

10. A distance measuring device comprising:
a light receiver configured to output an electrical signal by detecting light reflected by an object;
a plurality of amplifiers configured to generate a plurality of amplified electrical signals by amplifying the electrical signal with different gains, respectively;
a plurality of delay circuits configured to generate a plurality of delayed electrical signals by delaying each of the plurality of amplified electrical signals during a certain time period;
a selector configured to select a delayed electrical signal that is obtained through an amplification with a highest gain among the different gains, after excluding any saturated signal from among the plurality of delayed electrical signals, based on a level of at least one amplified electrical signal from among the plurality of amplified electrical signals;
a peak detector configured to detect a peak of the delayed electrical signal; and
a processor configured to measure a distance to the object based on the peak of the delayed electrical signal.

11. The distance measuring device of claim 10, wherein the selector comprises:
a comparator configured to output a comparison result signal by comparing the level of the at least one amplified electrical signal with at least one critical level;
a selection controller configured to output a selection control signal corresponding to the comparison result signal; and
a multiplexer configured to select the delayed electrical signal from among the plurality of delayed electrical signals according to the selection control signal.

12. A distance measuring method comprising:
outputting an electrical signal by detecting light reflected by an object;
generating a plurality of amplified electrical signals by amplifying the electrical signal with different gains, respectively;
generating a plurality of peak detection signals by detecting a peak from each of the plurality of amplified electrical signals;
selecting a peak detection signal that is obtained through an amplification with a highest gain among the different gains, after excluding any saturated signal from among the plurality of peak detection signals, based on a level of at least one amplified electrical signal from among the plurality of amplified electrical signals; and
measuring a distance to the object based on the peak detection signal.

13. The distance measuring method of claim 12, wherein the measuring the distance comprises measuring the distance to the object in a digital domain by using a time-to-digital converter (TDC) or an analog-to-digital converter (ADC).

14. The distance measuring method of claim 12, wherein the selecting comprises selecting the peak detection signal from among the plurality of peak detection signals by comparing the level of the at least one amplified electrical signal with at least one critical level.

15. The distance measuring method of claim 12, further comprising:
sensing an ambient temperature of a light receiver which detects the light reflected by the object; and
controlling the at least one critical level according to the ambient temperature.

16. The distance measuring method of claim 12, wherein the selecting comprises:
outputting a comparison result signal by comparing the level of the at least one amplified electrical signal with at least one critical level;
outputting a selection control signal corresponding to the comparison result signal; and
selecting the peak detection signal from among the plurality of peak detection signals according to the selection control signal.

17. The distance measuring method of claim 16, wherein the outputting the selection control signal comprises outputting the selection control signal by using a delay flip-flop (D flip-flop).

18. The distance measuring method of claim 17, wherein the outputting comprises:
outputting a current by detecting the light, using at least one of an avalanche photo diode (APD) and a single photon avalanche diode (SPAD);
converting the current to a voltage; and
outputting the voltage as the electrical signal.

19. The distance measuring method of claim 17, wherein the generating the plurality of peak detection signals comprises detecting the peak by using a constant fraction discriminator (CFD) method.

20. A non-transitory computer-readable storage medium storing a program to perform the distance measuring method of claim 17.

* * * * *